United States Patent [19]

Reynolds

[11] Patent Number: 4,557,160
[45] Date of Patent: Dec. 10, 1985

[54] HYDRAULIC DIFFERENTIAL TRANSMISSION

[75] Inventor: Richard W. Reynolds, Rockford, Ill.

[73] Assignee: Sundstrand Corporation, Rockford, Ill.

[21] Appl. No.: 642,078

[22] Filed: Aug. 20, 1984

[51] Int. Cl.⁴ ............................................. F16H 47/04
[52] U.S. Cl. ........................................ 74/687; 74/714; 74/731
[58] Field of Search .................. 74/687, 714, 730, 731

[56] References Cited

U.S. PATENT DOCUMENTS

| | | | |
|---|---|---|---|
| 2,808,737 | 10/1957 | Bullard, III | 74/687 |
| 2,817,250 | 12/1957 | Förster | 74/687 |
| 2,972,905 | 2/1961 | Bullard, III | 74/687 X |
| 3,318,172 | 5/1967 | Cummins | 74/682 |
| 3,603,176 | 9/1971 | Tipping | 74/687 |
| 3,665,788 | 5/1972 | Nyman | 74/687 X |
| 3,714,846 | 2/1973 | Louis et al. | 74/687 |
| 3,722,324 | 3/1973 | Cordner et al. | 74/687 |
| 3,786,696 | 1/1974 | Aleem | 74/687 |
| 3,796,111 | 3/1974 | Schauer | 74/687 |
| 3,979,972 | 9/1976 | Sakai et al. | 74/687 |
| 4,232,568 | 11/1980 | Maeda | 74/687 |
| 4,259,881 | 4/1981 | Meyerle | 74/687 |
| 4,291,592 | 9/1981 | Meyerle et al. | 74/687 |
| 4,304,151 | 12/1981 | Meyerle et al. | 74/687 |
| 4,306,467 | 12/1981 | Pollman | 74/687 |
| 4,341,131 | 7/1982 | Pollman | 74/687 |
| 4,382,392 | 5/1983 | Meyerle et al. | 74/687 |
| 4,434,681 | 3/1984 | Friedrich et al. | 74/687 |

*Primary Examiner*—Rodney H. Bonck
*Assistant Examiner*—Dwight G. Diehl
*Attorney, Agent, or Firm*—Wood, Dalton, Phillips, Mason & Rowe

[57] ABSTRACT

A hydraulic differential transmission utilizing an input differential and having a hydrostatic transmission with a variable output speed to the input differential whereby the speed of the transmission drive output can be maintained constant with variable drive input speeds to the transmission. The hydraulic differential transmission has a pair of parallel drive trains between the drive shaft of the fixed displacement unit of the hydrostatic transmission and the input differential, with the two drive trains providing different drive ratios therebetween. A first drive train including an overrunning clutch provides a one to one drive ratio therebetween when operating at higher drive input speeds. The other drive train includes a second differential and a second overriding clutch providing a lesser drive ratio between the fixed displacement hydraulic unit and the first differential when operating at lower drive input speeds. The overrunning clutches enable a shift between drive trains at a shift point where the drive shaft of the fixed displacement hydraulic unit changes direction of rotation without any discontinuity in the drive at the shift point. The change in drive ratios for operation at the higher drive input speeds causes the hydraulic units of the hydrostatic transmission to operate at higher pressures and nearer their normal pressure capabilities.

16 Claims, 4 Drawing Figures

HYDRAULIC DIFFERENTIAL TRANSMISSION

DESCRIPTION

Technical Field

This invention relates to a hydraulic differential transmission, particularly usable as a constant speed drive wherein the speed of the drive output is maintained constant, with the input speed being variable. The hydraulic differential transmission utilizes an input planetary differential connected to a drive input and a drive output and a hydrostatic transmission having a pair of hydraulically interconnected hydraulic units. One hydraulic unit with variable displacement is connected to the drive output and the other hydraulic unit is connected to the planetary differential.

In an input differential transmission, the pressure in the hydrostatic transmission for a given mode is inversely proportional to the drive input speed which means that the hydraulic units will be operating at less than their normal pressure capabilities at the higher drive input speeds. It is desirable to effect an increase in the operating pressure in the hydrostatic transmission to more nearly utilize the normal pressure capabilities of the hydraulic units. This is achieved by having two different drive ratios between the drive input and the hydrostatic transmission with the shift in drive ratio being effected by relatively simple and minimum weight structure and without a discontinuity in the drive at the shift point between drive ratios. The accomplishment of the shift with minimum weight structure is important, since a particular use of the hydraulic differential transmission is as a constant speed drive for use in an electrical generating system for an aircraft.

BACKGROUND OF THE INVENTION

A hydraulic differential transmission utilizes a differential and a pair of hydraulically interconnected hydraulic units to control a speed relation between a drive input and a drive output. For many years, a hydraulic differential transmission has been used as a constant speed drive for a generator or alternator providing constant frequency electric power for an aircraft. The drive output must be maintained at a constant speed while the speed of the drive input from an aircraft engine varies. In use as a constant speed drive, it is difficult to make maximum use of the capability of the hydraulic units.

The hydraulic differential transmission can use either an output differential wherein the hydraulic units are driven from the drive input and the output differential functions to sum the speed of the drive input with the drive output of the hydraulic units or an input differential wherein the hydraulic units are driven by the drive output and the input differential sums the speed of the drive input and the speed of the drive output from the hydraulic units.

In the hydraulic differential transmission utilizing an output differential, one of the hydraulic units which is driven by the drive input must operate over the speed range of the drive input and, therefore, is able to drive the other hydraulic unit up to only a portion of its rated speed at minimum drive input speed.

In a hydraulic differential transmission utilizing an input differential, the pressure in the hydraulic units for a given mode is inversely proportional to the input speed which results in the hydraulic units operating at less than the normal pressure capabilities at the higher drive input speeds.

In either type of hydraulic differential transmission, the speed range can be reduced. One possibility for reducing the speed range is to achieve a change in drive ratios between the drive input speed and the hydraulic unit connected to the differential. This can be achieved by use of a shifting gearbox with resulting reduction in the speed range. However, the use of such a gearbox is undesirable, particularly in a constant speed drive for an aircraft because of the weight thereof and there is a discontinuity in the drive at the shift point between drive ratios.

The Zentz U.S. Pat. No. 3,733,924, owned by the assignee of this application, discloses a constant speed drive utilizing an output differential. The Reynolds et al U.S. Pat. No. 3,274,855, owned by the assignee of this application, discloses a constant speed drive utilizing an input differential for transmitting power from an aircraft engine to a generator to drive the latter at a constant speed regardless of variations of engine speed and load. The constant speed drive disclosed in the Reynolds et al patent is illustrative of a hydraulic differential transmission into which the invention disclosed in this application may be incorporated.

The invention to be described hereinafter embodies the incorporation of a second drive train between the input differential of the hydraulic differential transmission and one of the hydraulically interconnected hydraulic units to provide alternate drive ratios therebetween and with means for automatically shifting between drive trains, dependent upon the direction of rotation of said one hydraulic unit.

DISCLOSURE OF THE INVENTION

The invention relates to a hydraulic differential transmission, utilizing an input differential, with means for achieving a ratio change between the drive input speed and the speed of a hydraulic unit which is summed with the drive input speed at the input differential to achieve a lower speed of the hydraulic unit at the higher drive input speeds to increase the pressure at which the hydraulic units are operating. The change in drive ratio results in better utilization of the hydraulic units to enable use of smaller size units with better efficiency, particularly when the hydraulic differential transmission is used in wide speed range applications.

The change in drive ratio is achieved without discontinuity in the drive at the shift point between drive ratios by means which senses the change in direction of rotation of the hydraulic unit operatively connected to the input differential. The input differential has plural relatively movable elements, one of which is connected to a drive input and another of which is connected to a drive output. A hydrostatic transmission has a pair of hydraulically interconnected hydraulic units, with one hydraulic unit being of variable displacement and operable to cause rotation of the other hydraulic unit output in either forward or reverse direction and with the output being operatively connected to a third element of the planetary differential. This operative connection is through two parallel drive trains, with one drive train being operable in one direction of rotation of the other hydraulic unit and the other drive train being operable in the opposite direction of rotation and with the two drive trains providing different drive ratios between the hydraulic unit and the differential.

The two drive trains between the hydraulic unit having an output operable either in a forward or reverse direction and the differential includes a first overrunning clutch in one drive train effecting a direct drive between the hydraulic unit and the third element of the differential when the hydraulic unit output is operable in one direction. The second drive train includes a second differential which is inoperative when the first overrunning clutch effects the drive for the first drive train and which is operative to provide a different drive ratio when the hydraulic unit output is operating in the other direction and the first overrunning clutch is inoperative. The drive train utilizing the second differential provides a lesser drive ratio than the first drive train. A second overrunning clutch is associated with the second differential and is effective to render the second differential operative.

An object of the invention is to provide a hydraulic differential transmission utilizing an input differential having means associated therewith to provide two different drive ratios between the input differential and the hydraulic unit associated therewith to provide for operation of the hydraulic units at their normal pressure capabilities at the higher levels of drive input speed to the input differential.

Another object of the invention is to provide a hydraulic differential transmission usable as a constant speed drive for achieving a constant output speed with a variable input speed and having means associated therewith to reduce the speed range at which the hydraulic units must operate to enable use of smaller, more efficient hydraulic units because of their operation at an increased hydraulic pressure and without the use of a shifting gearbox.

Still another object of the invention is to provide a hydraulic differential transmission as defined in the preceding paragraph wherein the speed range is reduced by varying the drive ratio between the drive input and the hydraulic unit associated with an input differential by the use of two drive trains therebetween. Each drive train has an overrunning clutch, with one overrunning clutch providing for a direct drive connection. The other overrunning clutch is associated with a second differential and operative when the first-mentioned overrunning clutch is inoperative to achieve a drive through the second differential and change in drive ratio. The operation of the overrunning clutches is responsive to the direction of rotation of the hydraulic unit associated with the input differential and occurs without any drive discontinuity at the shift point.

The hydraulic differential transmission comprises an input planetary differential having plural elements, with one element connected to a drive input and another element connected to a drive output. A pair of hydraulically interconnected hydraulic units include a variable displacement unit and a fixed displacement unit, with the variable displacement unit operable to cause a variation in the speed of the fixed displacement hydraulic unit as well as a change in direction in rotation thereof. The output drive of the last-mentioned hydraulic unit is operatively connected to a third element of the planetary differential. The speed of the fixed displacement unit can be varied whereby the speed thereof as summed at the input planetary differential with the speed of the drive input can provide a constant speed of the drive output.

A first overrunning clutch is in a first drive train between the fixed displacement hydraulic unit and the third element of the planetary differential. A second drive train is in parallel with the first drive train and includes a second planetary differential having one element connected to the fixed displacement hydraulic unit, another element connected to the third element of the first planetary differential and an additional element grounded through an overrunning clutch.

At relatively low drive input speeds, the fixed displacement hydraulic unit is rotating in a direction to add speed at the first planetary differential and the first overrunning clutch is operative. At higher drive input speeds, the fixed displacement hydraulic unit is rotating in a direction to subtract speed at the planetary differential and the second drive train is operative at a different drive ratio to subtract speed at the first planetary differential.

A further object of the invention is to provide a hydraulic differential transmission having a drive input and a drive output comprising a first differential for transmitting a drive from the drive input to the drive output, a pair of hydraulic units hydraulically interconnected with one unit being of variable displacement and connected to the drive output and the other hydraulic unit being reversible in rotation, and two parallel drive trains for alternatively connecting said other hydraulic unit to said first differential with one drive train including an overrunning clutch engageable when said other hydraulic unit rotates in one direction and the other drive train including a second differential which freely rotates when the other hydraulic unit rotates in one direction and which transmits a drive when the other hydraulic unit rotates oppositely to said one direction.

BEST MODE FOR CARRYING OUT THE INVENTION

Figure 1:
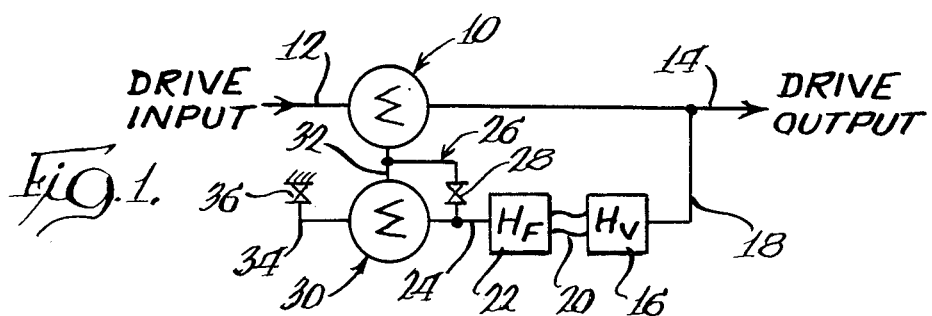
FIG. 1 is a schematic of the hydraulic input differential transmission.

The hydraulic differential transmission is schematically shown in FIG. 1. An input differential 10, which is preferably a planetary differential, has a plurality of relatively movable elements, with one element being connected to a drive input through an input shaft 12 and another element connected to a drive output through an output shaft 14. A hydrostatic transmission has a pair of hydraulically interconnected hydraulic units, with a first of the hydraulic units being a variable displacement hydraulic unit 16 drivingly connected to the output shaft 14 by a drive connection, indicated at 18. This variable displacement hydraulic unit is connected in a closed loop by fluid passages 20 to a fixed displacement hydraulic unit 22. The displacement of the variable displacement hydraulic unit may be varied to vary the speed of the fixed displacement hydraulic unit 22. As more particularly described in connection with FIG. 4, the variable displacement hydraulic unit 16 has a displacement-setting member in the form of a wobbler 77 which can be positioned for zero displacement and, therefore, nonrotation of the fixed displacement unit 22 as well as positions to either side thereof for controlling the direction of rotation of the output of the fixed displacement unit as well as the speed thereof.

A first drive train interconnects a drive shaft 24 driven by the fixed displacement hydraulic unit with a third element of the differential 10, as indicated by a drive connection 26 including an overrunning clutch 28.

A second drive train is operatively connected between the fixed displacement hydraulic unit 22 and the differential 10 and includes a second differential, indicated generally at 30, which preferably is a planetary differential having three relatively movable elements. One of these elements is connected to a third element of the first differential 10 by a drive connection 32 which also has a connection to the drive connection 26 of the first gear train. Another element of the differential 30 connects to the drive shaft 24 of the fixed displacement hydraulic unit 22 and an additional element of the differential 30 is grounded for nonrotation in one direction through a ground connection 34 including a second overrunning clutch 36.

One use of the hydraulic differential transmission is in a constant speed drive for driving an alternator or generator. In the constant speed drive as used for an aircraft, the drive input is from an aircraft engine having an engine shaft which can operate at different speeds, while the output speed for driving the alternator or generator must remain constant to provide a constant frequency output. As well known in the art, the output speed of the hydrostatic transmission can be controlled to either add or subtract speed at the first differential 10 whereby there can be a constant drive output speed, even though the drive input speed may vary. When the speed of the drive input, acting through the differential 10, is not sufficient to provide the desired output speed, the hydrostatic transmission inputs a drive in one direction to the differential 10. Conversely, when the drive input speed is greater than that required for the desired drive output speed, the hydrostatic transmission inputs a drive in an opposite direction to the differential 10.

Figure 2:
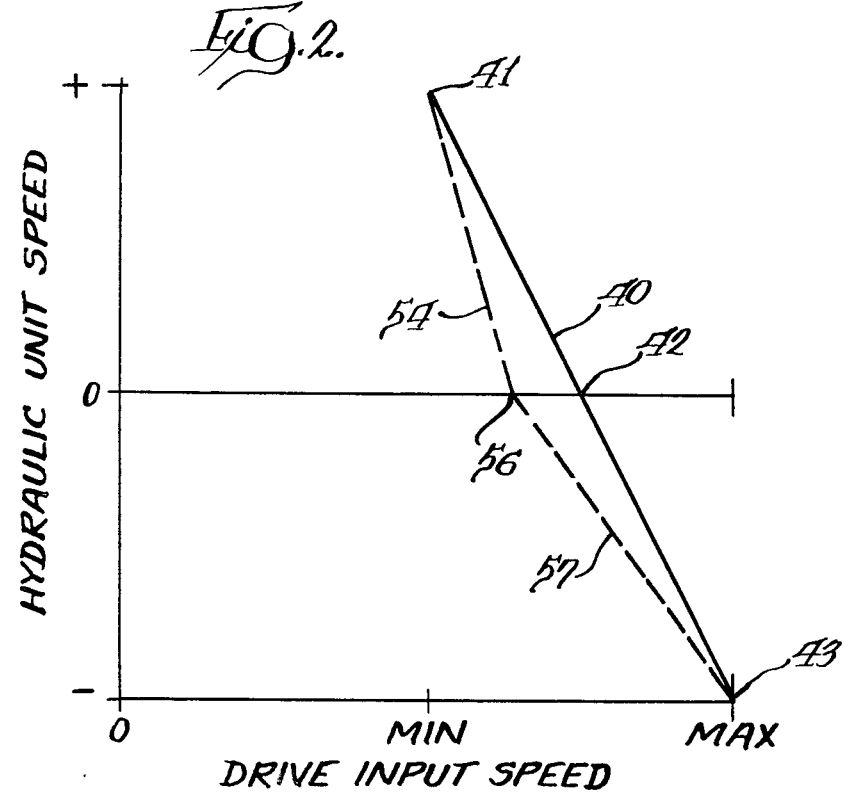
FIG. 2 is a graph plotting variable hydraulic unit speed with respect to drive input speed.

The speed of the fixed displacement hydraulic unit in a conventional input differential transmission is shown in FIG. 2 by a solid line 40. The graph of FIG. 2 plots the speed of the fixed displacement hydraulic unit in relation to drive input speed. When the drive input speed is at a normal minimum speed, the fixed displacement unit is operating at maximum speed in one direction of rotation, as indicated at point 41. As the drive input speed increases, the fixed displacement hydraulic unit speed reduces to zero at point 42. At this time, the variable displacement unit of the hydrostatic transmission is set at zero displacement. As the drive input speed increases further, the wobbler 77 of the hydraulic unit 16 moves to the opposite side of a neutral position to cause increasing rotative speed of the output of the fixed displacement hydraulic unit in an opposite direction and, when the drive input speed is at a maximum, the fixed displacement hydraulic unit is rotating at maximum speed, as indicated at point 43.

Figure 3:
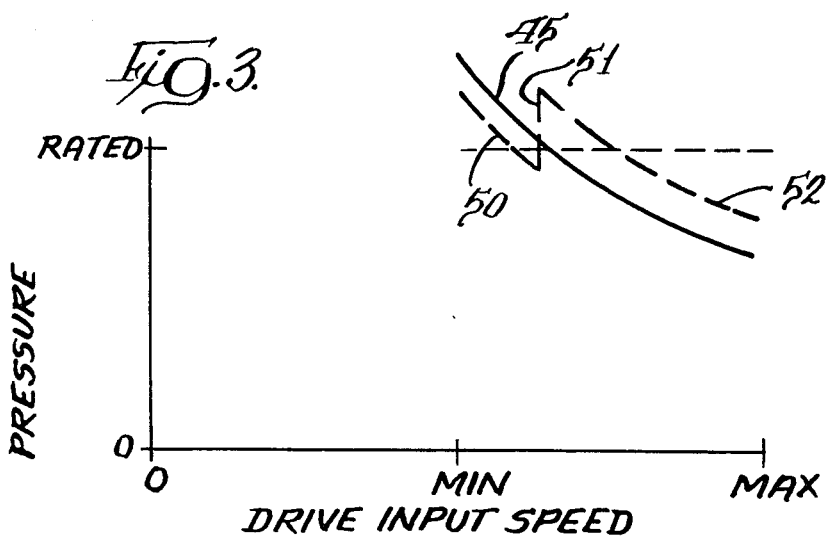
FIG. 3 is a graph plotting hydraulic unit pressure with respect to drive input speed for a conventional input differential transmission and for such a transmission embodying the invention.

The pressure at which the hydraulic displacement units operate in a conventional input differential transmission is shown in the graph of FIG. 3 which plots hydraulic unit pressure for a constant horsepower load relative to drive input speed. At a minimum drive input speed the pressure, as shown by the solid line 45, is above rated pressure. The hydraulic unit pressure progressively decreases below rated pressure as the drive input speed increases to a maximum. As evidenced by the decreasing hydraulic unit pressure, the hydraulic units will operate at less than their normal pressure capabilities at the higher input speeds in a conventional hydraulic differential transmission utilizing an input differential as, for example, the transmission disclosed in the previously-mentioned Reynolds et al patent.

The invention disclosed herein provides for reducing the speed range of the fixed displacement hydraulic unit whereby the hydraulic units will more nearly use their normal pressure capabilities to enable the use of smaller size units having better efficiencies and without there being any discontinuity at the shift point between a change in the drive ratio to the input differential. This operation at higher pressures is illustrated by the broken line in FIG. 3. The line section 50 shows initial operation at a lower pressure and a decrease in pressure as the drive input speed increases above minimum. There is a rise in pressure, as indicated by line section 51 at the shift point and, thereafter, a decrease in pressure, as indicated by the line section 52, with increasing drive input speeds. The line section 52 shows hydraulic unit pressure at a higher level than in a conventional transmission, as indicated by the line 45.

This operation is achieved by modifying the drive ratio between the fixed displacement hydraulic unit 22 and the differential 10, as illustrated by broken line in FIG. 2. At the lower drive input speeds, the speed of the fixed displacement hydraulic unit 22 is less than in a conventional input differential transmission, as indicated by the broken line section 54. The shift point is indicated at 56. As the drive input speed increases beyond the shift point speed, the speed of the fixed displacement hydraulic unit 22 increases as indicated by the broken line section 57 and with the drive shaft 24 rotating in an opposite direction.

The pressure for a given mode is inversely proportional to the input speed which, in a normal input differential transmission, means that the hydraulic units will be operating at less than their normal pressure capabilities at the higher drive input speeds. With the ratio change at the shift point 56, there will be an increase in the hydraulic unit pressure at drive input speeds above the shift point, as indicated by the broken line sections 51 and 52, in FIG. 3.

Figure 4:
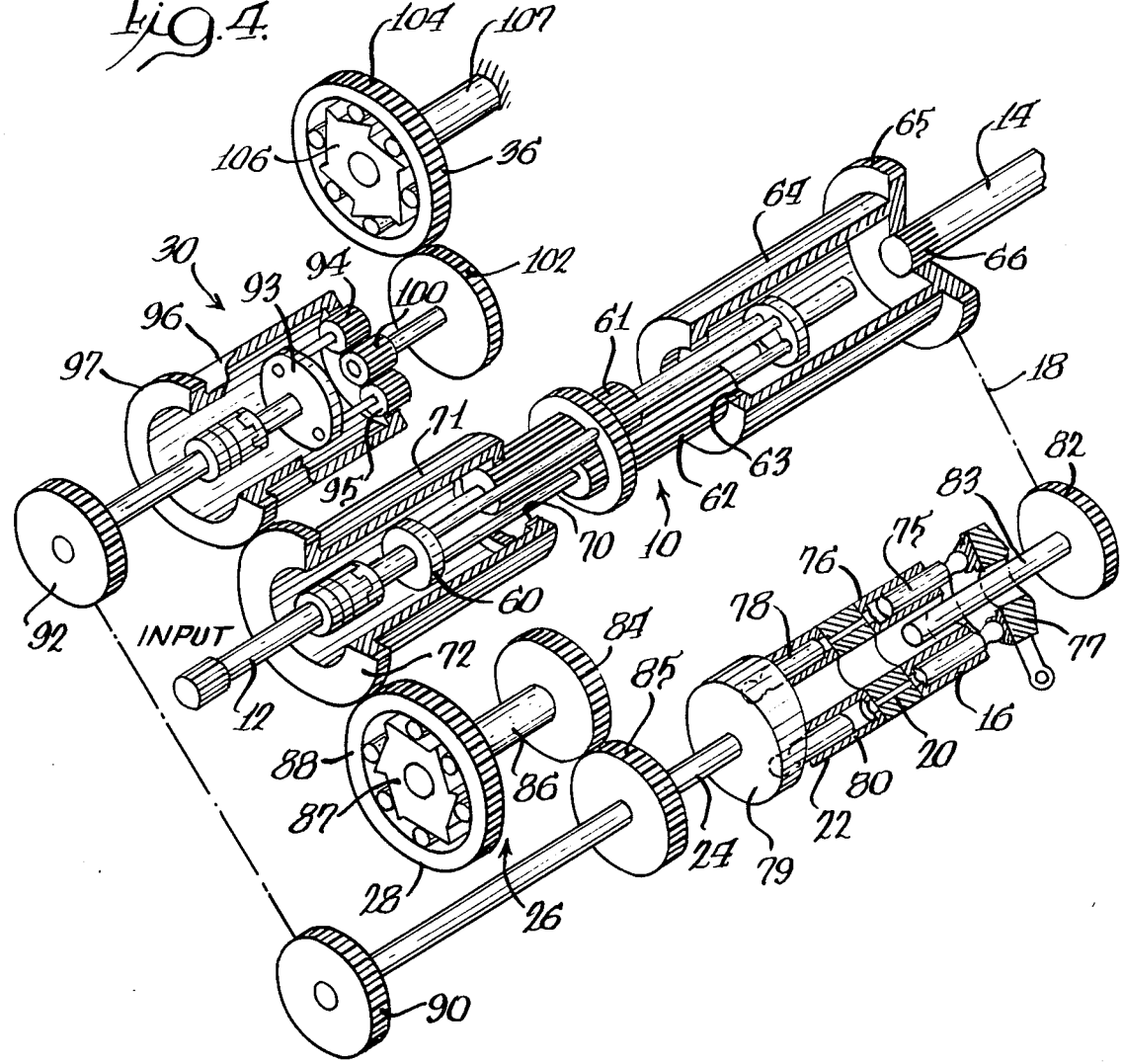
FIG. 4 is a diagrammatic perspective view of the hydraulic differential transmission with parts shown in section.

A structural embodiment of the new and improved hydraulic differential transmission is shown in FIG. 4. The differential 10 is shown as a planetary differential, with the drive input shaft 12 connected to a carrier 60 having a pair of longitudinally offset intermeshing planet gears 61 and 62 defining one element of the planetary differential 10. A second element of the planetary differential 10 is an internal ring gear 63 meshing with the planet gear 62 and shown in association with a tubular member 64 having an external gear 65 with a splined connection 66 to the drive output shaft 14. The third element of the planetary differential 10 is an internal ring gear 70 which meshes with the planet gear 61 and is associated with a tubular member 71 having an external gear 72.

The variable displacement hydraulic unit 16 is of the axial piston type having a series of pistons 75 reciprocal in a rotatable block 76 and with the stroke thereof being controllable by the pivotally-mounted wobbler 77. The fixed displacement hydraulic unit 22 is also of the axial piston type having the pistons 78 coacting with a fixed displacement-setting member 79 and mounted in a rotatable block 80 connected to the output shaft 24. The construction of the axial piston fixed and variable displacement units is well known in the art. The wobbler 77 has a neutral position wherein the pistons 75 do not have any stroke axially of the rotatable block 76, with resulting nonrotation of the block 80 and no drive output to the output shaft 24. The wobbler can be moved to either side of this position to control the forward or reverse direction of rotation of the output shaft 24 as well as the speed thereof.

The block 76 of the variable unit is driven by the drive output shaft 14 through the connecting drive line 18 between the external gear 65 and a gear 82 fixed to a shaft 83 which is splined to the cylinder block 76. The first drive train, indicated by the connecting line 26 in FIG. 1, is shown as including the meshing gears 84 and 85, with the latter gear being fixed to the drive shaft 24. The gear 84 is fixed to a shaft 86 extending therefrom and which is connected to a drive member 87 of the overrunning clutch 28. The overrunning clutch 28 can be of a conventional ball and ramp structure and includes an external gear 88 which meshes with the gear 76 associated with the internal ring gear 70 of the planetary differential 10. The first drive train establishes a one to one drive ratio between the fixed displacement hydraulic unit and the planetary differential 10 to establish the relation between hydraulic unit speed and drive input speed, as indicated by broken line section 57 in FIG. 2.

The second drive train has the second planetary differential 30 in parallel with the first gear train and with the connection thereto being provided by a gear 90 fixed to an extension of the fixed displacement hydraulic unit drive shaft 24. The gear 90 is drivingly connected to a gear 92 to drive one element of the planetary differential 30 and, more specifically, a carrier 93 having planet gears 94. Another element of the planetary differential 30 is an internal ring gear 95 which meshes with the planet gears 94 and is associated with a tubular member 96 having an external gear 97. The internal ring gear 95 is drivingly associated with the third element of the planetary differential 10, namely, internal ring gear 70, by a mesh between the gears 97 and 72.

An additional element of the planetary differential 30 is a sun gear 100 meshing with the planet gears 94 and 95 and having a shaft extending therefrom mounting a gear 102 which meshes with an external gear 104 of the second overrunning clutch 36 of the ball and ramp type, with an internal member 106 being supported on a shaft 107 which is fixed against rotation.

When the hydraulic differential transmission is operating at drive input speeds between the minimum and the shift point 56, as shown in FIG. 2, the drive shaft 24 of the fixed displacement hydraulic unit 22 is rotating in a direction to cause freewheeling of the overrunning clutch 28 and rotation of the carrier 93 of the second planetary differential 30 in a direction to urge rotation of the sun gear 100 thereof in a direction to cause lockup of the overrunning clutch 36. This results in rotation of the internal ring gear 95 of the second planetary differential 30 and a drive of the internal ring gear 70 of the first planetary differential 10 through the intermeshing gears 72 and 97. As the drive input speed increases, the hydrostatic transmission is controlled in a manner known in the art to reduce the drive through the second planetary differential to the first planetary differential and at the shift point 56 the output from the fixed displacement hydraulic unit 22 is zero. Further increase in the drive input speed causes a positioning of the wobbler 77 to cause rotation of the fixed displacement hydraulic unit drive shaft 24 in the opposite direction from the previous direction of rotation which causes a drive through the overrunning clutch 28 in a one to one ratio as compared to the one-half to one ratio through the second planetary differential 30. With the reversal in direction of rotation of the drive shaft 24, the rotation imparted to the carrier 93 of the second planetary differential 30 urges the sun gear 100 in a direction of rotation wherein the sun gear 100 is free to rotate as permitted by the free rotation of the overrunning clutch 36.

The addition of the second drive train with a planetary differential and the pair of overrunning clutches operable alternatively dependent upon the direction of rotation of the drive shaft of the fixed displacement unit, enables a ratio change between the fixed displacement hydraulic unit and the planetary differential 10 at a shift point where the hydraulic unit changes direction of rotation to achieve an increase in the hydraulic unit pressure at input speeds above this point and without any drive discontinuity at the shift point.

I claim:

1. A hydraulic differential transmission having a drive input and a drive output comprising, a first differential for transmitting a drive from the drive input to the drive output, a pair of hydraulic units hydraulically interconnected with one unit being of variable displacement and connected to the drive output and the other hydraulic unit being reversible in rotation, and two parallel drive trains for alternatively connecting said other hydraulic unit to said first differential with one drive train including an overrunning clutch engageable when said other hydraulic unit rotates in one direction and the other drive train including a second differential which freely rotates when the other hydraulic unit rotates in said one direction and which transmits a drive to said first differential when the other hydraulic unit rotates oppositely to said one direction.

2. A hydraulic differential transmission having a drive input means and a drive output means, a differential having plural relatively movable elements with a first element connected to the drive input means and a second element connected to the drive output means, a hydrostatic transmission having a pair of hydraulically interconnected hydraulic units with at least one hydraulic unit being of variable displacement and drivingly connected to said drive output means and said other hydraulic unit being operatively connected to a third element of said differential, the improvement comprising, a second differential in an operative connection of said other hydraulic unit to said third element of the first-mentioned differential, and means for either making or bypassing a drive connection between said other hydraulic unit and said third element through the second differential to vary the speed relation between the drive input means and said other hydraulic unit.

3. A hydraulic differential transmission as defined in claim 2 wherein the drive output means is to operate at a constant speed while the speed of the drive input means may vary, and the displacement of said variable displacement hydraulic unit is adjustable to maintain said constant speed.

4. A hydraulic differential transmission as defined in claim 2 wherein said means for either making or bypassing said drive connection includes an overrunning clutch connected in parallel with said second differential between said third element and said other hydraulic unit.

5. A hydraulic differential transmission as defined in claim 4 wherein said second differential has plural relatively movable elements with one element connected to said third element and another element connected to said other hydraulic unit, and a second overrunning clutch connected to an additional element of said second differential and operative to lock said additional element against rotation in one direction of rotation of said other hydraulic unit.

6. A hydraulic differential transmission comprising, a planetary differential with plural relatively movable elements including a driven element, a drive output element, and a third element, a pair of hydraulic units which are hydraulically interconnected, one of said hydraulic units being of variable displacement and operable to cause rotation of the other hydraulic unit in either forward or reverse directions and at a speed within a range of speeds, said one hydraulic unit being operatively connected to said drive output element, and means including a second planetary differential connecting said other hydraulic unit to said third element to effect one drive ratio between the other hydraulic unit and said third element when said other hydraulic unit is operating in one rotative direction and to effect a different drive ratio when said other hydraulic unit is operating in an opposite rotative direction.

7. A hydraulic differential transmission as defined in claim 6 wherein said one drive ratio exists when the speed relation between said driven element and said drive output element is below a predetermined value and the different drive ratio exists above said predetermined value.

8. A hydraulic differential transmission as defined in claim 7 wherein said means to effect said drive ratios includes an overrunning clutch operable to bypass said second planetary differential to achieve said different drive ratio.

9. A hydraulic differential transmission as defined in claim 8 wherein said means to effect said drive ratios further includes a second overrunning clutch to render said second planetary differential operative to transmit a drive from said other hydraulic unit to said third element to achieve said one drive ratio.

10. A hydraulic differential transmission having a drive input and a drive output, a first differential having plural relatively movable elements with a first element connected to the drive input and a second element connected to the drive output, a hydrostatic transmission having a pair of hydraulically interconnected hydraulic units with at least one hydraulic unit being of variable displacement and drivingly connected to said drive output and the other hydraulic unit being operatively connected to a third element of said differential, the improvement comprising, a second differential in an operative connection of said other hydraulic unit to said third element of the first-mentioned differential, and means for effecting different drive ratios between said other hydraulic unit and said first differential by either making or bypassing a drive connection between said other hydraulic unit and said third element through the second differential.

11. A hydraulic differential transmission as defined in claim 10 wherein one drive ratio exists when the speed relation between said drive input and said drive output is below a predetermined value and a different drive ratio exists above said predetermined value.

12. A hydraulic differential transmission as defined in claim 10 wherein said means to effect said different drive ratios includes an overrunning clutch operable to bypass said second differential to achieve said different drive ratio.

13. A hydraulic differential transmission as defined in claim 12 wherein said means to effect said different drive ratios further includes a second overrunning clutch to render said second differential operative to transmit a drive from said other hydraulic unit to said third element.

14. A hydraulic input differential transmission comprising, a drive input shaft, a driven output shaft, a planetary differential having a carrier connected to said drive input shaft and mounting a pair of rotatable meshing planet gears, said planetary differential having a pair of ring gears meshing one with each of said planet gears, one of said ring gears being operatively connected to said driven output shaft, a hydrostatic transmission having a pair of hydraulic units hydraulically interconnected, one of said hydraulic units being operatively connected to the driven output shaft and of variable displacement and having a movable wobbler movable overcenter to control the speed and direction of rotation of a gear driven by the other hydraulic unit, a first drive train including an overrunning clutch connecting said gear to the other of said ring gears, a second drive train including a second planetary differential connecting said gear to said other ring gear, and a second overrunning clutch permitting free rotation of the elements of the second planetary differential when said first drive train is operable in one direction of rotation of said gear and in the other direction of rotation of said gear locking one element of the second planetary differential to effect a drive through said second drive train.

15. An input differential transmission as defined in claim 9 usable as a constant speed drive wherein the speed of the drive input shaft can vary while the speed of the driven output shaft is maintained constant.

16. An input differential transmission comprising, a drive input shaft, a driven output shaft, a planetary differential having a carrier connected to said drive input shaft and mounting a pair of rotatable meshing planet gears, said planetary differential having a pair of ring gears meshing one with each of said planet gears, one of said ring gears being operatively connected to said driven output shaft, a hydrostatic transmission having a pair of hydraulic units hydraulically interconnected, one of said hydraulic units being operatively connected to the driven output shaft and of variable displacement and having a movable wobbler movable overcenter to control the speed and direction of rotation of a gear driven by the other hydraulic unit, a first drive train connecting said gear to the other of said ring gears when said gear rotates in one direction, a second drive train including a second planetary differential connecting said gear to said other ring gear, and means permitting free rotation of the elements of the second planetary differential when said gear rotates in said one direction of rotation and for locking one element of the second planetary differential when said gear rotates in the other direction of rotation to effect a drive through said second drive train.

* * * * *